United States Patent
Hartmann et al.

[11] Patent Number: 6,026,138
[45] Date of Patent: Feb. 15, 2000

[54] METHOD AND DEVICE FOR SAFEGUARDING THE DISCHARGE OF RESIDUAL HEAT FROM A REACTOR OF A NUCLEAR POWER STATION

[75] Inventors: Heinz-Werner Hartmann, Buckenhof; Pius Mackert, Erlangen, both of Germany

[73] Assignee: Siemens Aktiengesellschaft, Munich, Germany

[21] Appl. No.: 09/160,852

[22] Filed: Sep. 25, 1998

Related U.S. Application Data

[63] Continuation of application No. PCT/EP97/01334, Mar. 17, 1997.

[30] Foreign Application Priority Data

Mar. 25, 1996 [DE] Germany .............................. 196 11 703

[51] Int. Cl.[7] ...................................................... G21C 9/00
[52] U.S. Cl. ............................ 376/299; 376/298; 376/282; 376/283
[58] Field of Search ..................................... 376/282, 283, 376/298, 299, 463, 260

[56] References Cited

U.S. PATENT DOCUMENTS

| | | | |
|---|---|---|---|
| 3,966,548 | 6/1976 | Muller et al. ............................. | 176/37 |
| 4,473,528 | 9/1984 | Kleimola .................................. | 376/282 |

(List continued on next page.)

FOREIGN PATENT DOCUMENTS

| | | |
|---|---|---|
| 053194 | 3/1989 | Japan . |
| 072096 | 3/1989 | Japan . |
| 183198 | 7/1990 | Japan . |
| 017598 | 1/1991 | Japan . |

OTHER PUBLICATIONS

Patent Abstracts of Japan No. 01–053194 (Hiroshi), dated Mar. 1, 1989.

(List continued on next page.)

*Primary Examiner*—Charles T. Jordan
*Assistant Examiner*—Jack Keith
*Attorney, Agent, or Firm*—Herbert L. Lerner; Laurence A. Greenberg

[57] ABSTRACT

A method for safeguarding discharge of residual heat from a nuclear power station reactor upon a lowered filling level in a primary circuit of a reactor cooling system, includes initially shutting down the reactor and running through an initial cooling and pressure reduction phase in the primary circuit. Then an aftercooling system is cut in for taking over heat discharge from the primary circuit, when heat discharge is no longer guaranteed by a steam generator plant. Then complete pressure relief and a lowering of the filling level in the cooling system to a mid-loop level of a main coolant conduit take place. A coolant reservoir is present for a required refilling of the primary circuit and aftercooling system. To prevent the aftercooling circuit from running dry if the filling level in the aftercooling circuit is lowered inadmissibly, the reservoir is connected to the suction-side connecting conduit through an additional safety flood conduit having a non-return valve and being opened during the lowering of the filling level, in the case of a pressureless reactor cooling system, when the filling level in the suction conduit falls. The non-return valve opens as a function of a closing force of the non-return valve and coolant flows from the reservoir into the suction conduit. The closing force of the non-return valve is increased with the reactor cooling system evacuated for coolant degassing by actuation of a pilot valve and is thereby adapted to modified pressure conditions in the evacuated cooling system.

12 Claims, 1 Drawing Sheet

U.S. PATENT DOCUMENTS

| | | | |
|---|---|---|---|
| 4,753,771 | 6/1988 | Conway et al. | 376/282 |
| 5,059,385 | 10/1991 | Gluntz et al. | 376/282 |
| 5,106,571 | 4/1992 | Wade et al. | 376/283 |
| 5,268,943 | 12/1993 | Corletti et al. | 376/282 |
| 5,329,564 | 7/1994 | Malloy, III | 376/299 |
| 5,428,652 | 6/1995 | Conrads et al. | 376/299 |
| 5,519,743 | 5/1996 | Van De Venne et al. | 376/282 |
| 5,579,355 | 11/1996 | Leidemann et al. | 376/298 |
| 5,659,591 | 8/1997 | Gelbe et al. | 376/298 |
| 5,748,693 | 5/1998 | Hartmann | 376/282 |

OTHER PUBLICATIONS

Patent Abstracts of Japan No. 03–017598 (Tsugio), dated Jan. 25, 1991.

Patent Abstracts of Japan No. 01–072096 (Kenji et al.), dated Mar. 16, 1989.

Patent Abstracts of Japan No. 02–183198 (Mitsuhiro), dated Jul. 17, 1990.

Dictionary of Nuclear Power Engineering, pp. 142–145, and 600–603.

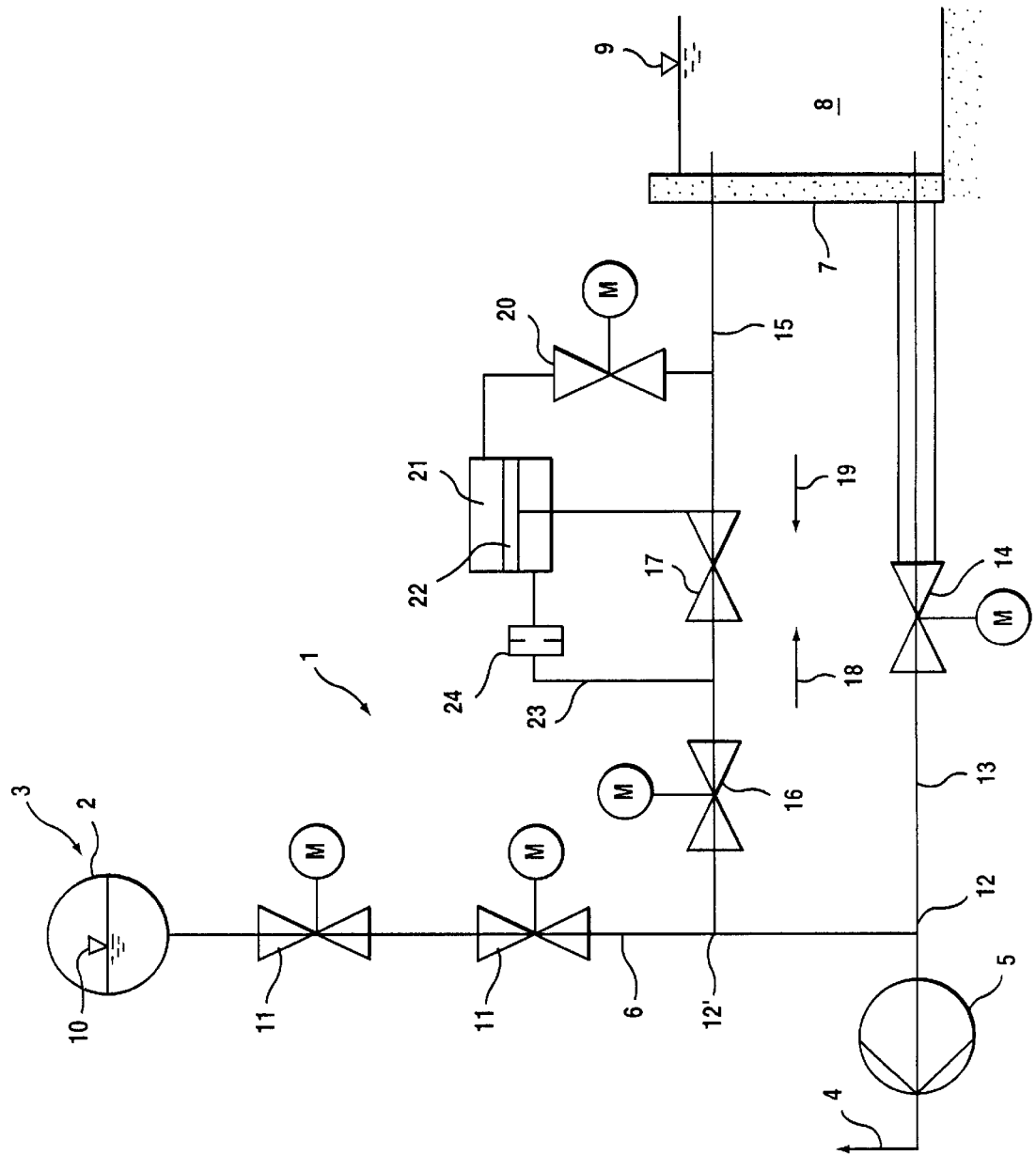

METHOD AND DEVICE FOR SAFEGUARDING THE DISCHARGE OF RESIDUAL HEAT FROM A REACTOR OF A NUCLEAR POWER STATION

CROSS-REFERENCE TO RELATED APPLICATION

This application is a continuation of International Application No. PCT/EP97/01334, filed on Mar. 17, 1997, which designated the United States.

BACKGROUND OF THE INVENTION

FIELD OF THE INVENTION

The invention relates generally to a method for safeguarding the discharge of residual heat from a reactor of a nuclear power station in the case of a lowered filling level in a primary circuit of a reactor cooling system. In particular, the method is to be employed during cleaning and maintenance operations in nuclear power stations having a pressurized water reactor. Moreover, the invention also relates to a device for safeguarding the discharge of residual heat from a reactor of a nuclear power station.

In nuclear power stations, particularly those with pressurized water reactors having a western-type of construction and mode of operation, the so-called discharge of residual heat below specific pressure and temperature states in the reactor cooling system takes place through the primary side of the cooling system. In methods according to the prior art the following method steps are carried out when maintenance and cleaning operations are initiated in the reactor:

Initially, the reactor is shut down and there is a wait until the cooling liquid in the primary circuit has cooled. Moreover, the pressure in the cooling system is reduced.

Then, the filling level of the primary circuit is lowered to about a mid-loop level of an MC conduit (main coolant conduit), an aftercooling system is cut in which takes over the heat discharge from the primary circuit, and the heat discharge in that opened and lowered state is no longer provided by a steam generator plant which is otherwise connected to the primary circuit when the nuclear power station is in operation.

Then, as a rule, in nuclear power stations of the type in question, a coolant reservoir is provided for the required refilling of the primary circuit of the shut-down reactor and/or of the aftercooling system. The coolant reservoir can be a boron water storage tank which is provided within the reactor containment and which is designated as "IRWST" (Incontainment Refilling Water Storage Tank). Such a coolant reservoir serves, as a rule, for flooding spaces above the opened reactor to the level of the fuel-assembly storage basin, until the fuel elements can be changed below the surface of the liquid. In European reactors of recent construction (EPR=European Pressurized Reactor), the coolant reservoir is provided as an "Incontainment System".

Such an emergency cooling plant with a coolant reservoir can be taken from a book entitled "Lexikon der Kern- und Reaktortechkik" [Lexicon of Nuclear and Reactor Engineering], Franckh'sche Verlagshandlung, W. Keller & Co., Stuttgart, Germany, 1959, pages 142–144.

An emergency cooling system which has a water tank is also known from U.S. Pat. No. 5,268,943. Cooling water originating from that water tank can be fed, if necessary, to the circuit of a nuclear reactor. Furthermore, the tank can then be refilled, when there is sufficient water in the circuit.

During the entire phase of maintenance work in which the filling level in the reactor cooling system is lowered, residual heat discharge, which is very important for the safety of a nuclear power station, may be appreciably disturbed by system errors. One of those possible malfunctions is an inadvertent excessive lowering of the filling level, which may lead to a total failure of aftercooling in the case of a relatively high decay potential of the reactor. In such an instance, the aftercooling pumps of the cut-in cooling system draw in air, so that bubbles may form in the cooling system, with the result that the cooling capacity falls rapidly.

While maintenance work is being carried out, as well as while in a pressureless state, the cooling system is also evacuated for coolant degassing in the case of a lowered filling level. As a result, with the filling level lowered, two different pressure states are to be observed in the reactor cooling system and on the cooling systems connected to it, and those pressure states make it even more complicated to limit and rectify malfunctions.

SUMMARY OF THE INVENTION

It is accordingly an object of the invention to provide a method and a device for safeguarding the discharge of residual heat from a reactor of a nuclear power station, which overcome the hereinafore-mentioned disadvantages of the heretofore-known methods and devices of this general type and which prevent an aftercooling circuit from running dry in the case of different pressure states when a filling level in the aftercooling circuit is lowered inadmissibly. With the foregoing and other objects in view there is provided, in accordance with the invention, a method for safeguarding the discharge of residual heat from a reactor of a nuclear power station in the case of a lowered filling level in a primary circuit of a reactor cooling system, especially during cleaning and maintenance operations, which comprises shutting down the reactor and running through an initial cooling and pressure reduction phase in the primary circuit of the cooling system; switching in an aftercooling system for taking over heat discharge from the primary circuit, in a state in which the heat discharge is no longer carried out by a steam generator plant; completing pressure relief and lowering of a filling level of the primary circuit to about a mid-loop level of a main coolant conduit; providing a coolant reservoir for a required refilling of the primary circuit of the reactor and/or of the aftercooling system; connecting the coolant reservoir to a suction-side connecting conduit of the aftercooling system through an additional safety flood conduit provided with a shut-off valve and with a non-return valve controlled by a pilot valve; opening the shut-off valve during the lowering of the filling level of the primary circuit to about the mid-loop level of the main coolant conduit; passing coolant from the coolant reservoir into the suction conduit, by opening the non-return valve, as a function of geodetic head ratios (filling level in the coolant reservoir/filling level in the suction conduit) and of a "normal" closing force of the non-return valve, when the filling level in the suction conduit falls below a predeterminable threshold value, in the case of a pressureless reactor cooling system; and actuating the pilot valve to increase and thereby adapt the closing force of the non-return valve to modified pressure conditions in the evacuated reactor cooling system, when the reactor cooling system is evacuated for coolant degassing.

The non-return valve which is used according to the invention therefore performs a triple function. Firstly, it prevents coolant from overflowing out of the reactor cooling system into the coolant reservoir when the filling level in the reactor cooling system is higher than the filling level of the coolant reservoir. Secondly, it allows coolant to overflow out of the coolant reservoir into the reactor cooling system when the liquid pressure on the coolant reservoir is higher than that on the reactor cooling system or the head difference falls below a predeterminable threshold value which overcomes the "normal" closing force of the non-return valve. Thirdly, an increase in the closing force of the non-return valve is brought about when a vacuum is applied to the reactor cooling system for coolant degassing, since it would otherwise be impossible to maintain the vacuum if coolant were to flow inadvertently into the reactor cooling system.

In accordance with another mode of the invention, as is provided in the EPR, the liquid reservoir is provided as a boron water storage tank within the reactor containment, since all of the safety flooding operations then take place within the reactor containment.

In accordance with a further mode of the invention, the non-return valve is constructed as a piston-type non-return valve and the closing force of the non-return valve is increased through the use of the liquid pressure of the coolant located in the liquid reservoir, with the liquid pressure acting on the control piston of the non-return valve. The method is thus further simplified, since complicated and temperamental control devices can be dispensed with.

In accordance with an added mode of the invention, the "normal" closing force of the non-return valve is determined essentially by the weight of the control piston displaceable therein in the vertical direction and by weight or spring elements cooperating therewith. These are components which act purely mechanically and are therefore easy to control and dimension and are consequently insensitive.

In accordance with an additional mode of the invention, the increased closing force of the non-return valve is brought about by applying pressure to a control space with coolant, and the control space is disposed above the control piston and acts in the closing direction. For this purpose, it is merely necessary to open the pilot valve which is constructed as a remotely controllable valve, and the liquid pressure of the coolant reservoir then automatically ensures the increase in the closing force.

In accordance with yet another mode of the invention, in both pressure states, namely in the pressureless and in the evacuated state, the respectively acting closing force of the non-return valve is dimensioned in such a way that opening of the non-return valve and overflow of coolant out of the coolant reservoir through the non-return valve into the coolant circuit occur before the filling level has fallen as far as a common connection point of the suction-side connecting conduit and of the safety flood conduit. If this were not so, bubbles would form undesirably in the region of the aftercooling pumps, with the result that there would no longer be any aftercooling of the reactor cooling system that is necessary for safety.

In accordance with yet a further mode of the invention, the shut-off valve and the pilot valve are opened automatically when the respective states of the reactor cooling system are initiated, and the safety function of the safety flood conduit is thereby activated.

With the objects of the invention in view, there is also provided, in a nuclear power station having a reactor and a reactor cooling system with a primary circuit, a device for safeguarding the discharge of residual heat from the reactor in the case of a lowered filling level in the primary circuit, the device comprising a primary-side aftercooling system (aftercooling pump/low-pressure feed pump) having at least one line and a suction-side connecting conduit connecting the at least one line to the reactor cooling system; a coolant reservoir; a closable flood conduit connecting the at least one line to the coolant reservoir; and an additional safety flood conduit connecting the coolant reservoir to the suction-side connecting conduit, the safety flood conduit having a remotely actuable shut-off valve and a non-return valve, the non-return valve can be activated to be opened for a throughput of coolant from the coolant reservoir to the connecting conduit in two different closing-force settings. The further flood conduit, namely the safety flood conduit, is provided in addition to the conventional flood conduit by which the coolant reservoir is connected to the primary-side aftercooling system.

In accordance with another feature of the invention, the non-return valve is a piston-type non-return valve having a control piston for determining an opening and closing behavior of the non-return valve.

In accordance with a concomitant feature of the invention, there is provided a pilot valve associated with the non-return valve, the control piston having a control space acting in a closing direction and receiving coolant by opening the pilot valve for increasing a closing force of the non-return valve.

Other features which are considered as characteristic for the invention are set forth in the appended claims.

Although the invention is illustrated and described herein as embodied in a method and a device for safeguarding the discharge of residual heat from a reactor of a nuclear power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic circuit diagram showing essential elements which are employed in the method and the device for safeguarding the discharge of residual heat from a reactor of a nuclear power station, according to the invention.

DESCRIPTION OF THE PREFERRED EMBODIMENTS

Referring now in detail to the single FIGURE of the drawing, there is seen a device 1 which is linked to an MC (main coolant) conduit 2 of a primary circuit of a reactor cooling system 3. The device 1 has a line 4 of a primary-side aftercooling system with an aftercooling pump/low-pressure feed pump 5 that is connected to the reactor cooling system 3 through a suction-side connecting conduit 6. Reference numeral 7 denotes a coolant reservoir in which coolant 8 with a filling level 9 is kept ready. A lowered filling level in the MC conduit 2 is denoted by reference numeral 10.

A plurality of motorized shut-off valves 11 which are provided in the suction-side connecting conduit 6 are opened in the course of activation of the primary-side aftercooling system.

A flood conduit 13 connected to the coolant reservoir 7 opens into the suction-side connecting conduit 6 at a first connection point 12. This flood conduit 13 can be shut off by a further shut-off valve 14 which can be opened for the purpose of supplying coolant 8 from the coolant reservoir 7 into the aftercooling system.

According to the invention, a safety flood conduit 15 is tied into the coolant reservoir 7 and opens into the suction-side connecting conduit 6 above the flood conduit 13 at a second connection point 12'. A shut-off valve 16 which is mounted in the safety flood conduit 15 is opened when measures for lowering the filling level in the primary circuit 2 are initiated. The shut-off valve 16 can be operated remotely.

Furthermore, a non-return valve 17 which is located in the safety flood conduit 15 has a return property by virtue of which it prevents coolant from flowing in the direction of an arrow 18, but allows it to flow in the direction of an arrow 19, by taking different pressure states into account. A first pressure state provides opening and coolant flow in the direction of the arrow 19 when the filling level 10 has fallen to an inadmissible level in the case of a pressureless cooling system. A liquid pressure of the coolant 8 is then sufficient to overcome the effective "normal" closing force of the non-return valve 17 and to introduce coolant 8 into the aftercooling system.

However, when the primary circuit 2 of the reactor of the cooling system 3 is evacuated for coolant gassing, the vacuum would be broken if the non-return valve 17 were to open prematurely, since the pressure on the conduit side shown on the left in the drawing is much lower than that on the conduit side shown on the right. It is therefore necessary to have a corresponding increase in closing force which is achieved by opening a pilot valve 20, so that coolant 8 flows into a control space 21 of a control piston 22 of the non-return valve 17 and loads the latter in the closing direction. This means that the closing force of the non-return valve 17 is increased, so that even with the primary circuit evacuated, no coolant passes into the primary circuit and the aftercooling system, unless the filling level 10 has fallen to a predeterminable value. The liquid pressure of the coolant 8 then overcomes the increased closing force of the non-return valve 17, and the non-return valve 17 opens and ensures automatic flooding of the reactor cooling system. In such a case, however, the vacuum state is not maintained. This is an additional safety-related effect, since the critical heat flux ratio in the suction-side connecting conduit increases at the same time. A relief conduit 23 with a flow-limit device 24 leads from a space below the control piston 22 into the safety flood conduct 15 between the non-return valve 17 and the shut-off valve 16. The purpose of the relief conduit 23 is to control the operation of the control piston 22.

This safety device is used within the framework of the aftercooling procedure. The necessary measures are carried out either by hand or automatically at a corresponding safety level (command monitoring and electrical interlocks).

We claim:

1. In a method for safeguarding the discharge of residual heat from a reactor of a nuclear power station in the case of a lowered filling level in a primary circuit of a reactor cooling system, the improvement which comprises:
    a) shutting down the reactor and running through an initial cooling and pressure reduction phase in the primary circuit of the cooling system;
    b) switching in an aftercooling system for taking over heat discharge from the primary circuit, in a state in which the heat discharge is no longer carried out by a steam generator plant;
    c) completing pressure relief and lowering of a filling level of the primary circuit to about a mid-loop level of a main coolant conduit;
    d) providing a coolant reservoir for a required refilling of at least one of the primary circuit of the reactor and the aftercooling system;
    e) connecting the coolant reservoir to a suction-side connecting conduit of the aftercooling system through an additional safety flood conduit provided with a shut-off valve and with a non-return valve controlled by a pilot valve;
    f) opening the shut-off valve during the lowering of the filling level according to step c);
        $f_1$) passing coolant from the coolant reservoir into the suction conduit, by opening the non-return valve, as a function of geodetic head ratios and of a normal closing force of the non-return valve, when the filling level in the suction conduit falls below a predeterminable threshold value, in the case of a pressureless reactor cooling system; and
        $f_2$) actuating the pilot valve to increase and thereby adapt the closing force of the non-return valve to modified pressure conditions in the evacuated reactor cooling system, when the reactor cooling system is evacuated for coolant degassing.

2. The method according to claim 1, which comprises performing the safeguarding during cleaning and maintenance operations.

3. The method according to claim 1, which comprises defining the geodetic head ratios as ratios of the filling level in the coolant reservoir to the filling level in the suction conduit.

4. The method according to claim 1, which comprises providing a boron water storage tank as the liquid reservoir, and passing the coolant from the boron water storage tank into the primary circuit within a reactor containment.

5. The method according to claim 1, which comprises increasing the closing force of the non-return valve, with the reactor cooling system evacuated, due to a liquid pressure of the coolant located in the liquid reservoir and acting on a control piston of the non-return valve.

6. The method according to claim 5, which comprises determining the closing force of the non-return valve essentially by a weight of the control piston displaceable therein in the vertical direction.

7. The method according to claim 5, which comprises increasing the closing force of the non-return valve, during the opening of the pilot valve, by applying pressure to a control space with coolant.

8. The method according to claim 1, which comprises dimensioning the closing force of the non-return valve to cause opening of the non-return valve and overflow of coolant out of the coolant reservoir through the non-return valve into the coolant circuit before the filling level has fallen as far as a connection point of the suction-side connecting conduit and of the safety flood conduit.

9. The method according to claim 1, which comprises automatically or manually opening the shut-off valve, upon manually initiating lowering of the filling level.

10. The method according to claim 1, which comprises automatically or manually activating the pilot valve for increasing the closing force of the non-return valve, during the evacuation of the reactor cooling system.

11. In a nuclear power station having a reactor and a reactor cooling system with a primary circuit, a device for safeguarding the discharge of residual heat from the reactor in the case of a lowered filling level in the primary circuit, the device comprising:

a primary-side aftercooling system having at least one line and a suction-side connecting conduit connecting said at least one line to the reactor cooling system;

a coolant reservoir;

a closable flood conduit connecting said at least one line to said coolant reservoir;

an additional safety flood conduit connecting said coolant reservoir to said suction-side connecting conduit, said safety flood conduit having a remotely actuable shut-off valve and a non-return valve, said non-return valve being a piston-type non-return valve having a control piston for determining an opening and closing behavior of said non-return valve, said non-return valve to be opened for a throughput of coolant from said coolant reservoir to said connecting conduit in two different closing-force settings, and a pilot valve associated with said non-return valve, said control piston having a control space acting in a closing direction and receiving coolant by opening said pilot valve for increasing a closing force of said non-return valve.

12. The device according to claim 11, wherein said primary-side aftercooling system includes an aftercooling/low-pressure feed pump.

* * * * *